(12) United States Patent
Lathrop et al.

(10) Patent No.: US 7,239,045 B2
(45) Date of Patent: Jul. 3, 2007

(54) POWER DISTRIBUTION SYSTEM AND CONTROL SYSTEM FOR SAME

(75) Inventors: Todd M. Lathrop, Freedom, PA (US); James R. Hanna, Beaver, PA (US)

(73) Assignee: Eaton Corporation, Cleveland, OH (US)

( * ) Notice: Subject to any disclaimer, the term of this patent is extended or adjusted under 35 U.S.C. 154(b) by 598 days.

(21) Appl. No.: 10/741,571

(22) Filed: Dec. 19, 2003

(65) Prior Publication Data

US 2005/0134121 A1 Jun. 23, 2005

(51) Int. Cl.
*H02J 9/06* (2006.01)
*H01H 7/00* (2006.01)
*H02J 3/00* (2006.01)
*H02J 9/08* (2006.01)

(52) U.S. Cl. .......................... 307/80; 307/44; 307/64; 307/85; 307/141; 307/143

(58) Field of Classification Search .................. 307/44, 307/80
See application file for complete search history.

(56) References Cited

U.S. PATENT DOCUMENTS

| | | | |
|---|---|---|---|
| 4,314,441 A | 2/1982 | Yannone et al. ........... 60/39.28 |
| 4,398,097 A | 8/1983 | Schell et al. .................. 307/64 |
| 4,760,278 A | 7/1988 | Thomson ...................... 307/64 |
| 5,081,367 A | 1/1992 | Smith et al. .................. 307/64 |
| 5,903,065 A * | 5/1999 | Dragos ........................ 307/64 |
| 6,067,482 A | 5/2000 | Shapiro ...................... 700/286 |
| 6,191,500 B1 | 2/2001 | Toy ............................. 307/64 |
| 6,559,559 B2 | 5/2003 | Cratty ......................... 307/64 |
| 6,611,068 B2 | 8/2003 | Cratty ......................... 307/64 |

* cited by examiner

*Primary Examiner*—Brian Sircus
*Assistant Examiner*—Hal I. Kaplan
(74) *Attorney, Agent, or Firm*—Martin J. Moran

(57) ABSTRACT

A control system for a power distribution system includes electrical operators each of which has an open input, a close input and an operator member adapted to cooperate with a corresponding circuit breaker operating mechanism. Each operator member responds to the corresponding open input to actuate the operating mechanism and open the corresponding circuit breaker, and responds to the corresponding close input to actuate the operating mechanism and close the corresponding circuit breaker. A control circuit includes an input for a normal power source, an input for an emergency power source, open outputs electrically connected to the open inputs of the corresponding electrical operators, and close outputs electrically connected to the close inputs of the corresponding electrical operator. The control circuit delays one or more of the close outputs or inhibits one or more of the close outputs after a transfer switch output switches to the emergency source.

20 Claims, 3 Drawing Sheets

POWER DISTRIBUTION SYSTEM AND CONTROL SYSTEM FOR SAME

BACKGROUND OF THE INVENTION

1. Field of the Invention

The present invention relates to power distribution systems and, more particularly, to control circuits for distribution panels powered from transfer mechanisms, such as, for example, transfer switches. The invention also relates to control systems for power distribution systems.

2. Background Information

Alternate power sources are provided for any number of applications, which cannot withstand a lengthy interruption in electric power. Typically, power is provided from a primary source with back-up power provided by a secondary source. Often, the primary source is a utility and the secondary source is an auxiliary power source, such as an engine driven generator or a second utility source. The transfers between the two power sources can be made automatically or manually.

In the case of a generator driven auxiliary power source, power must be stabilized before the transfer can be made to the secondary source. In any event, the two power sources cannot be connected to the load simultaneously unless they are in phase. Thus, an open transition transfer may be employed in which the previously connected source is disconnected from the load before the other source is connected.

Transfer switches are known in the art. Transfer switches operate, for example, to transfer a power consuming load from a circuit with a normal power supply to a circuit with an auxiliary power supply. Applications for transfer switches include stand-by applications, among others, in which the auxiliary power supply stands-by if the normal power supply should fail. Facilities having a critical requirement for continuous electric power, such as hospitals, certain plant processes, computer installations, and the like, have a standby power source, often a diesel generator. A transfer switch controls connection of the utility lines and the diesel generator to the facility load buses. In many installations, the transfer switch automatically starts the standby generator and connects it to the load bus upon loss of utility power, and reconnects the utility power to the load bus if utility power is reestablished.

Transfer switches typically affect an open transition between the power sources, that is, one is disconnected from the load bus before the other one is connected. Other transfer switches provide a closed transition wherein the oncoming source is connected to the load bus before the other is disconnected, in order that both power sources are connected in parallel during the transition.

Transfer switches commonly used to connect alternate power sources to a load, including networks, utilize a pair of switches each connecting one of the sources to the load. In order to prevent connecting unsynchronized sources together, the operation of the two switches is coordinated, typically by a mechanical interlock, in order that only one switch at a time can be turned on. A transfer switch typically comprises a pair of circuit interrupters combined with a drive input and a linkage system. See, for example, U.S. Pat. Nos. 5,081,367; 4,760,278; and 4,398,097.

U.S. Pat. No. 6,067,482 discloses a controller coupled with six compressors in a refrigeration system. Transfer switches are associated with each of the compressors and are selectively coupled by the controller with a utility or a generator/fuel cell. Each of the transfer switches is operable between a first position in which its associated load is connected to the utility power source and disconnected from the generator, and a second position in which its load is connected to the generator and disconnected from the utility. A processor includes two modes of operation. A first mode is implemented when the cost of locally generated energy is lower than the utility, and demand is shifted to the generator up to the maximum generator capacity. The second mode is in effect when the utility's energy rates are lower than the local energy cost, and demand is shifted to the generator only for peak shaving purposes. In the first mode, both maximum energy and peak power are shifted from the utility to the generator. In the second mode, maximum peak power and minimum energy are shifted from the utility to the generator. The processor is adapted to select a preferred combination of loads regardless of whether the transfer switches have a neutral position.

U.S. Pat. No. 6,191,500 discloses that a critical load includes those loads whose operation must be continuous. Such loads may include computer systems, communication systems and life support systems. A conventional uninterruptible power supply (UPS) system may include other loads as well as the critical load. These other loads may include building loads, HVAC loads, lighting loads, and various other loads whose operation may be desirable but not critical. These loads may be prioritized in and taken on and offline depending on power available. Typically, these loads would be online during normal operation and offline during the interruption of, for example, both utility sources.

U.S. Pat. No. 6,191,500 also discloses that the UPS system includes a plurality of UPS modules electrically coupled to at least two utility sources. Generator paralleling switchgear includes a load priority and load shedding control system that adds or reduces load on a generator bus. Each load in the UPS system has a preassigned wattage rating, which the control system employs to determine how many loads can be added as generators come onto the generator bus. As generators are randomly connected to the generator bus, the control system signals for connection of the loads in ascending sequential priority, with the highest priority load being connected first. All load-add steps are preceded by a time delay, adjustable from 0 to 3 seconds.

There is room for improvement in power distribution systems and control systems therefore.

SUMMARY OF THE INVENTION

These needs and others are met by the present invention, which provides a control system for a power distribution system that delays or inhibits the closing of one or more separable contacts of one or more electrical switching apparatus after a transfer mechanism switches from one power source to another. This permits one or more loads to be powered at the same predetermined time or at different predetermined times after the transfer mechanism switches to a second or emergency power source. Hence, for the same predetermined time, power is provided to such loads at a suitable time after the transfer to the second power source. Also, for the different predetermined times, the control system sequentially steps power to the loads at suitable different times. Alternatively, some of the loads may be powered, while other loads are not powered, after the transfer mechanism switches to the emergency power source.

In accordance with one aspect of the invention, a power distribution system for a first power source and a second power source comprises: means for inputting the first power source and the second power source, and switching one of the first power source and the second power source to an output; at least one electrical switching apparatus, each of the at least one electrical switching apparatus including an input electrically connected to the output of the means for inputting, an output, separable contacts electrically connected between the input and the output, and an operating mechanism for opening and closing the separable contacts; at least one operator, each of the at least one operator including a first input, a second input, and an operator member cooperating with the operating mechanism of a corresponding one of the at least one electrical switching apparatus, the operator member of the at least one operator responsive to the first input thereof to actuate the operating mechanism of the corresponding one of the at least one electrical switching apparatus to open the separable contacts thereof, the operator member of the at least one operator responsive to the second input thereof to actuate the operating mechanism of the corresponding one of the at least one electrical switching apparatus to close the separable contacts thereof; and a control circuit including a first input for the first power source, a second input for the second power source, a third input for the output of the means for inputting, at least one first output electrically connected to the first input of a corresponding one of the at least one operator, at least one second output electrically connected to the second input of a corresponding one of the at least one operator, and means for delaying the at least one second output or inhibiting at least one of the at least one second output after the means for inputting switches to the other one of the first and second power sources.

As another aspect of the invention, a control system is for a power distribution system including a first power source, a second power source, a transfer mechanism and at least one electrical switching apparatus, the transfer mechanism inputting the first power source and the second power source and switching one of the first power source and the second power source to an output, each of the at least one electrical switching apparatus including an input electrically connected to the output of the transfer mechanism, an output, separable contacts electrically connected between the input and the output of the electrical switching apparatus, and an operating mechanism for opening and closing the separable contacts. The control system comprises: at least one operator, each of the at least one operator including a first input, a second input, a third input for the output of the transfer mechanism, and an operator member adapted to cooperate with the operating mechanism of a corresponding one of the at least one electrical switching apparatus, the operator member of the at least one operator responding to the first input thereof for actuating the operating mechanism of the corresponding one of the at least one electrical switching apparatus to open the separable contacts thereof, the operator member of the at least one operator responding to the second input thereof for actuating the operating mechanism of the corresponding one of the at least one electrical switching apparatus to close the separable contacts thereof; a first input for the first power source; a second input for the second power source; at least one first output electrically connected to the first input of a corresponding one of the at least one operator; at least one second output electrically connected to the second input of a corresponding one of the at least one operator; and means for delaying the at least one second output or inhibiting at least one of the at least one second output after the means for inputting switches to the other one of the first and second power sources.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
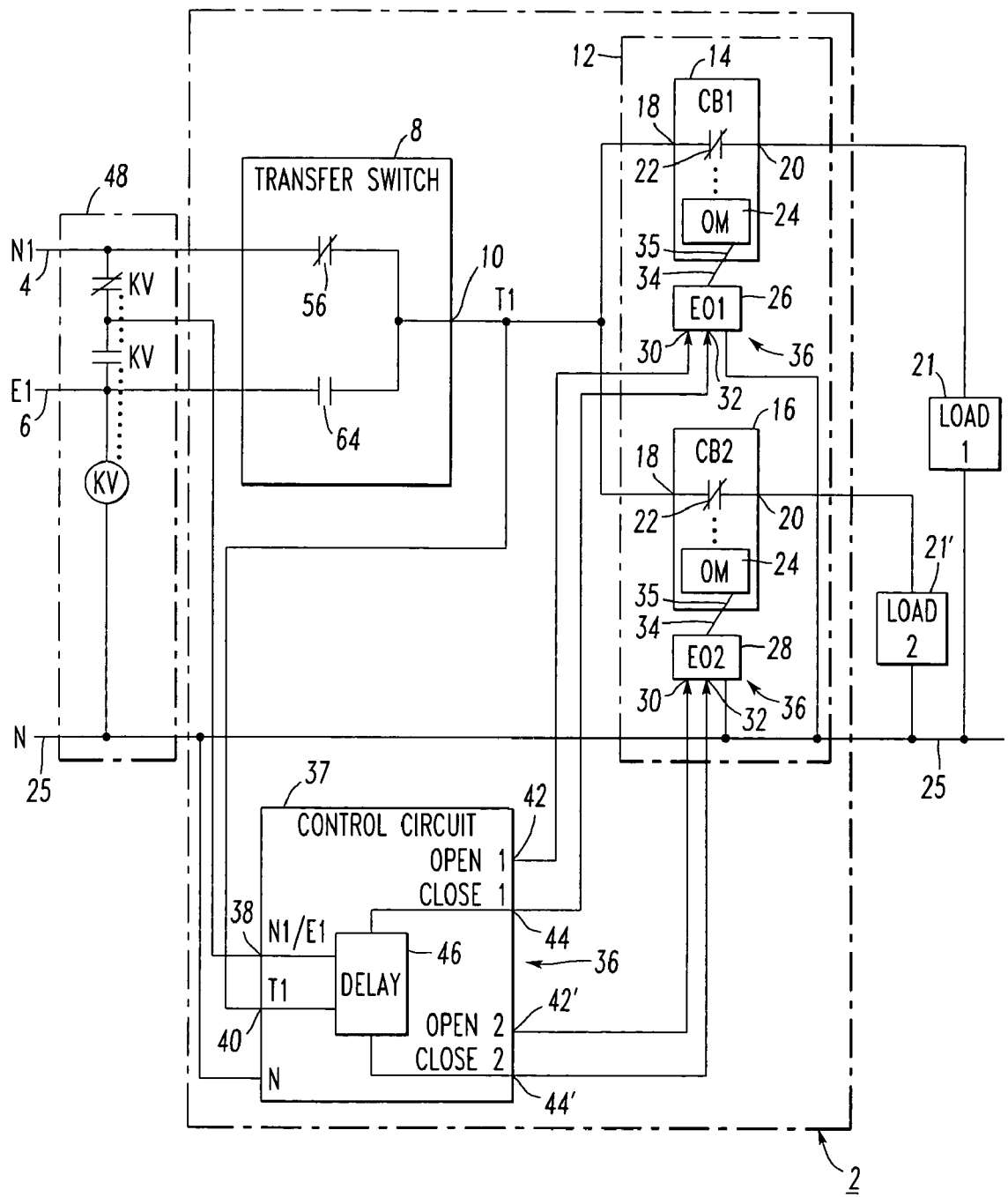
FIG. 1 is a block diagram of a power distribution system in accordance with the present invention.

Referring to FIG. 1, a power distribution system 2 receives a first power source (N1) 4 (e.g., normal; utility; primary) and a second power source (E1) 6 (e.g., emergency; generator; back-up; auxiliary). The system 2 includes a suitable transfer mechanism, such as transfer switch 8, inputting the first power source 4 and the second power source 6, and switching one of such power sources to a load output (T1) 10. The system 2 also includes a distribution panel 12 having one or more electrical switching apparatus, such as circuit breakers (CB1) 14 and (CB2) 16. Although two circuit breakers are shown, the invention is applicable to any suitable count (e.g., one, three or more) of electrical switching apparatus (e.g., circuit breakers; contactors). As is well known, each of the circuit breakers 14,16 includes an input, such as line terminal 18, electrically connected to the transfer switch output 10, an output, such as load terminal 20, separable contacts 22 electrically connected between the terminals 18,20, and an operating mechanism (OM) 24 for opening and closing the separable contacts 22. Operatively associated with the two load terminals 20 are loads 21 (LOAD 1) and 21' (LOAD 2). Although an unswitched neutral line (N) 25 is shown, the invention is applicable to transfer mechanisms (not shown), which switch the neutral line.

Suitable operators, such as electrical operators 26 (EO1) and 28 (EO2), are operatively associated with the circuit breakers 14 and 16, respectively. Each of the electrical operators 26,28 includes a first or open input 30, a second or close input 32, and an operator member 34 cooperating with the operating mechanism 24 (e.g., by pivoting operating handle 35) of the respective circuit breakers 14,16. The operator member 34 responds to the open input 30 to actuate the corresponding circuit breaker operating mechanism handle 35 and open the separable contacts 22, and responds to the close input 32 to actuate such handle 35 and close such separable contacts 22.

A control system 36 includes a suitable control circuit 37 and the electrical operators 26,28. The control circuit 37 includes a first input 38, a second input 40 for the transfer switch output 10, one or more first or open outputs 42,42' electrically connected to the first or open inputs 30 of the corresponding electrical operators 26,28, and one or more second or close outputs 44,44' electrically connected to the second close inputs 32 of the corresponding electrical operators 26,28. In accordance with the invention, the control system 36 includes a circuit 46 for delaying the second or close outputs 44,44' or for inhibiting one or more of the second or close outputs 44,44' after the transfer switch 8 switches to the second power source 6.

In this example, AC power to the first input 38 of the control circuit 37 is supplied from a suitable "voting" circuit 48, although any suitable alternating current power source (e.g., 120 VAC) may be employed.

EXAMPLE 1

Figure 2:
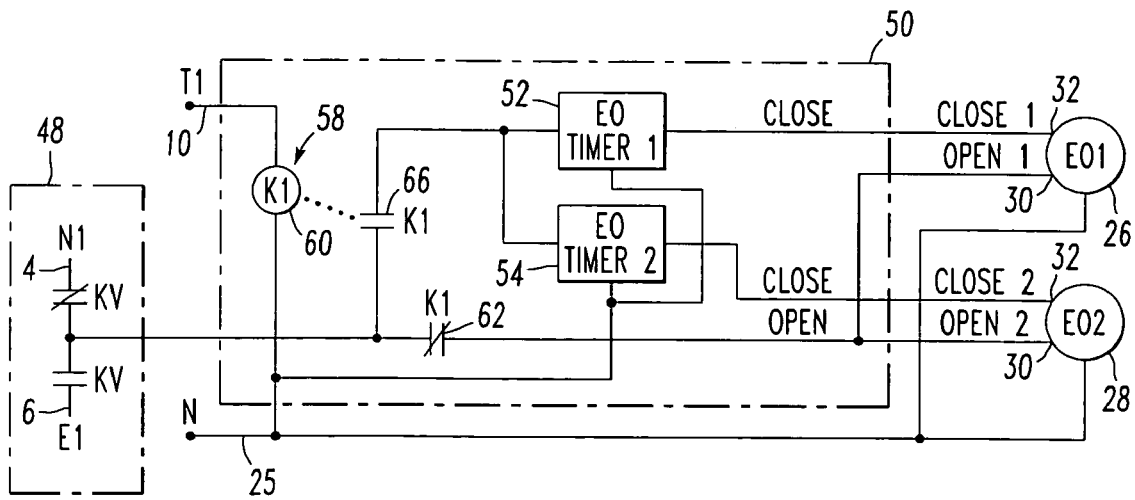
FIG. 2 is a block diagram of a control system in accordance with an embodiment of the invention.

FIG. 2 shows a control circuit 50 for step loading a distribution panel (e.g., the distribution panel 12 of FIG. 1) using two example electrical operators 26,28 (EO1, EO2) and two example time delay timers 52,54 (EO TIMER 1, EO TIMER 2). Although two electrical operators 26,28 are shown, the invention is applicable to one, three or more of such electrical operators for one, three or more corresponding loads (e.g., the loads 21,21' of FIG. 1).

Initially, the first or normal power source N1 4 (FIG. 1) is available and is connected to the load output (T1) 10 of the transfer switch (e.g. transfer switch 8 of FIG. 1), which applies the power source N1 4 to the load output T1 10 through closure 56. A load sensing relay K1 58 is energized and power is supplied to the timers 52,54 and then to the electrical operators 26,28. Internal cutoff switches (not shown) sense when the switching operation (e.g., of CB1 14 and CB2 16 of FIG. 1) is complete and remove power from the EOs 26,28.

Upon loss of power to power source N1 4, K1 relay coil 60 de-energizes. At this time, the transfer switch 8 (FIG. 1) sends a signal (not shown) to a generator (not shown), in order to start or, else, the generator is started manually. The transfer switch 8 also senses and determines the availability of the second or emergency power source E1 6. A K1 normally closed (NC) contact 62 responds to the coil 60 and applies power from the voting circuit 48 to the open inputs 30 of the two EOs 26,28. This occurs at this point and, preferably, when the transfer switch 8 is in its "neutral" or no source connected state. The EOs 26,28 responsively cause the respective circuit breakers 14,16 to open, thereby disconnecting the loads 21,21' from the transfer switch 8. Any non electrically operated distribution circuit breakers (not shown) in the distribution panel 12 associated with the transfer switch 8 will remain closed.

Next, the transfer switch 8 applies the power source E1 6 to the load output T1 10 through closure 64. The K1 relay coil 60 energizes, closes its normally open (NO) K1 contact 66 and applies power to the two EO timers 52,54. Then, the EO timers 52,54 time out and apply power to the close inputs 32 of the EOs 26,28, which allows each EO to close at different predetermined (e.g., by customer; by end user) times. This allows the control circuit 50 to step load the power source E1 6 (e.g., the corresponding emergency generator (not shown)). In this regard, the timers 52,54 may be set, for example, such that only one of the distribution circuit breakers 14,16 closes at one time, thereby allowing the generator (not shown) to suitably assume the initial load (e.g., LOAD 1 21) and stabilize before more load (e.g., LOAD 2 21') is applied.

Upon return of power to the power source N1 4, the transfer switch 8 senses the return of the power source N1 4 and commences the re-transfer back to that power source. When the transfer switch 8 reaches the neutral position (not shown) (e.g., a time delay in the neutral position is supplied for this application), the load output T1 10 is disconnected from both the power sources N1 4 and E1 6. Then, the K1 relay coil 60 de-energizes and applies power through NC contact 62 to the open inputs 30 of the EOs 26,28, which open the respective distribution circuit breakers 14,16. In this example, after the time delay in the neutral position has completed, the transfer switch 8 connects the power source N1 4 to the load output T1 10. The K1 relay coil 60 then re-energizes, closes NO contact 66 and applies power to the EO timers 52,54. Then, the EO timers 52,54 time out and apply power to the close inputs 32 of the EOs 26,28, which allows each EO to close at the different predetermined (e.g., by customer; by end user) times.

In this example, both modes of operation function in the same manner (e.g., non-selective) for both the transition from N1 4 to E1 6 and for the transition from E1 6 to N1 4. For example, this occurs regardless whether the cause of transfer is a loss of a power source, an engine test function, a plant exercise function, a load shed from utility function, or another suitable cause. The step loading depends upon the transfer switch 8, since the transfer switch's time delay in its neutral position, which is greater than or equal to the time to open all of the controlled distribution circuit breakers 14,16, is employed in order to ensure that all EOs 26,28 open prior to connection to the power source E1 6.

EXAMPLE 2

Figure 3:
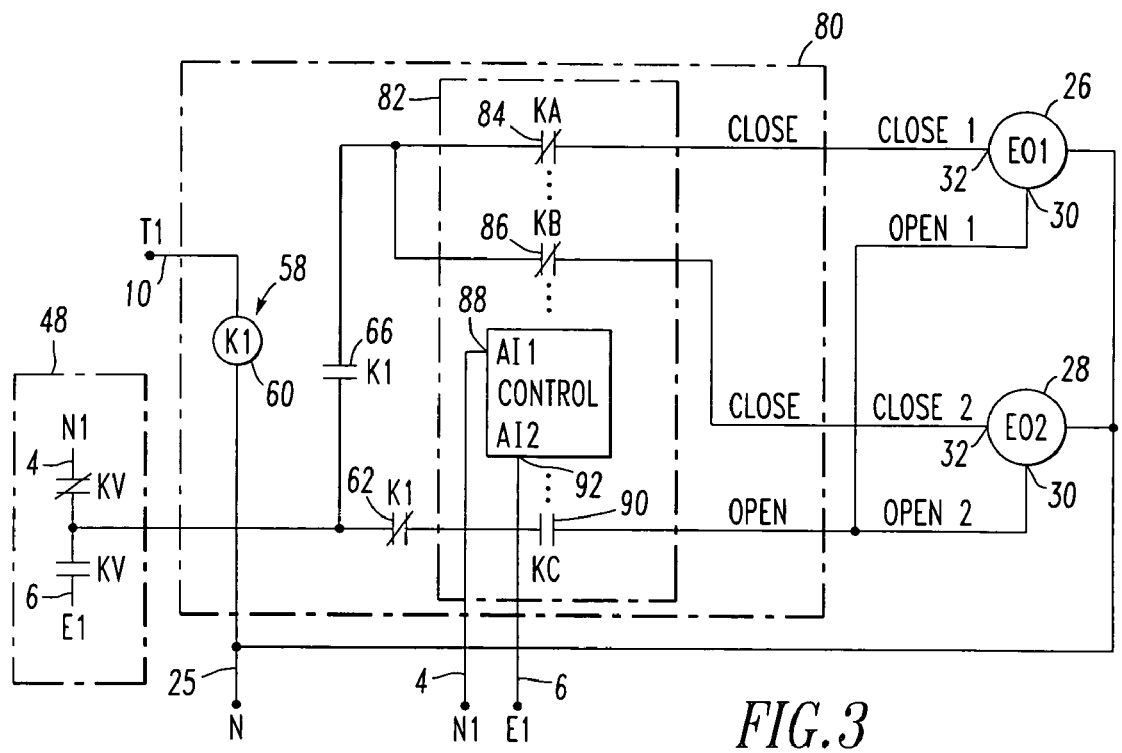
FIG. 3 is a block diagram of a control system in accordance with another embodiment of the invention.
Figure 4:
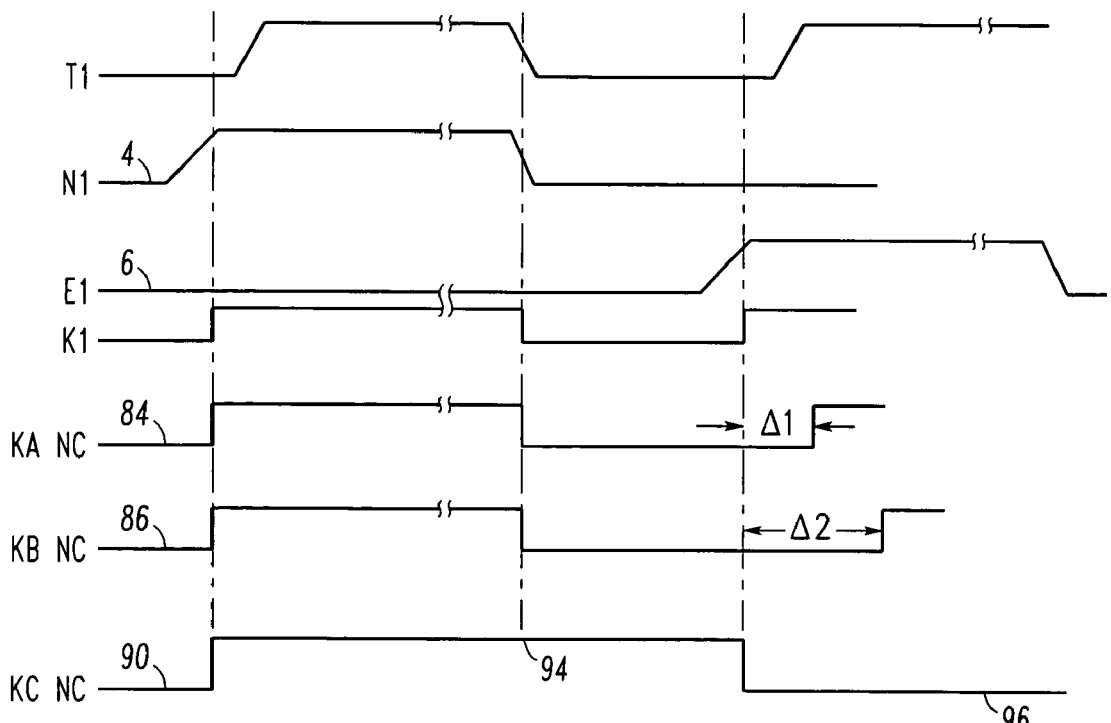
FIG. 4 is a timing diagram of power sources and signals employed by the control system of FIG. 3.

FIG. 3 shows an example control circuit 80 employing a suitable controller 82 (e.g., a programmable logic controller (PLC); another suitable controller; a suitable control circuit including normally open and/or closed contacts). Initially, the first or normal power source N1 4 (FIG. 1) is available and is connected to the load output (T1) 10 of the transfer switch (e.g., transfer switch 8 of FIG. 1), which applies the power source N1 4 to the load output T1 10 through closure 56. The load sensing K1 relay coil 60 is energized, NO contact 66 is closed and power is supplied to the NC contacts 84,86 (KA, KB) and then to the close inputs 32 of the EOs 26,28 when those contacts are closed. For example, as shown in FIG. 4, contacts KA NC 84 and KB NC 86 may be closed immediately after the normal power source N1 4 (FIG. 1) reaches a suitable voltage as detected by the controller 82 at analog input (AI1) 88. For example, the EOs 26,28 may employ internal cutoff switches (not shown), which sense when the switching operation (e.g., of CB1 14 and CB2 16 of FIG. 1) is complete and remove power from the EOs 26,28. Also, the normally open (NO) contact KC 90 is closed immediately after the normal power source N1 4 (FIG. 1) reaches a suitable voltage as detected by the controller 82, and is opened immediately after the emergency power source E1 6 (FIG. 1) reaches a suitable voltage as detected by the controller 82 at analog input (AI2) 92. This causes the open position of the EOs 26,28 to be activated (at point 94 of FIG. 4) only upon loss of the normal power source N1 4, but not (as shown at point 96) upon loss of the emergency power source E1 6.

Upon loss of power to power source N1 4, K1 relay coil 60 de-energizes. At this time, the transfer switch 8 (FIG. 1) sends a signal to a generator (not shown), in order to start or, else, the generator is started manually. The transfer switch 8 also senses and determines the availability of the second or emergency power source E1 6. The K1 normally closed (NC) contact 62 applies power from the voting circuit 48 to the open inputs 30 of the EOs 26,28, with the KC NO contact 90 being closed. This occurs at this point and, preferably, when the transfer switch 8 is in its "neutral" or no source connected state. The EOs 26,28 responsively cause the respective circuit breakers 14,16 (FIG. 1) to open, thereby disconnecting the loads 21,21' from the transfer switch 8.

Any non electrically operated distribution circuit breakers (not shown) associated with the transfer switch 8 will remain closed.

Next, the transfer switch 8 (FIG. 1) applies the power source E1 6 to the load output T1 10 through closure 64. The K1 relay coil 60 energizes, closes its NO contact 66 and applies power to the NC contacts 84,86, as shown. Although NC contacts 84,86 are shown, NO contacts (not shown) may be employed. Then, the controller 82 (e.g., employing external switches; preset programming set points) determines which EO 26,28 to close and closes the corresponding NC contact(s) 84,86 of those EOs 26,28 (for sub-loads 21,21') that the application wants to close, and opens the others. For example, as shown in FIG. 4, contacts KA NC 84 and KB NC 86 may be closed sequentially at predetermined times (e.g., Δ1 and Δ2, respectively) after the emergency power source E1 6 (FIG. 1) reaches a suitable voltage as detected by the controller 82 at analog input (AI2) 92. This exclusivity in closing is what allows the controller 82 to step load the power source E1 6 (e.g., the corresponding generator (not shown)). The closure of the selected contacts 84,86 applies power to the close inputs 32 of the corresponding EOs 26,28. This allows those load(s), as determined by the controller 82, to receive power from the second power source E1 6. The controller 82 may be set, for example, such that only one of the distribution circuit breakers 14,16 (FIG. 1) closes at one time, thereby allowing the generator to suitably assume the initial load and stabilize before more load is applied.

Upon return of power to the power source N1 4, the transfer switch 8 (FIG. 1) senses the return of the power source N1 4 and commences the re-transfer back to that power source. When the transfer switch 8 reaches the neutral position (not shown) (e.g., a time delay in its neutral position (e.g., when closures 56,64 are both open) is supplied for this application), the load output T1 10 is disconnected from both the power sources N1 4 and E1 6. Then, the K1 relay coil 60 de-energizes and attempts to apply power through the closed K1 NC contact 62 to the open inputs 30 of the EOs 26,28, which would open the distribution circuit breakers 14,16 (FIG. 1). However, as was discussed above, the KC NO contact 90 was opened in response to the presence of the emergency power source E1 6. In this example, after the time delay in the neutral position has completed, the transfer switch 8 connects the power source N1 4 to the load output T1 10, which power is immediately available through the circuit breakers 14,16, which remained closed.

EXAMPLE 3

In this example, the KC NO contact 90 of FIG. 3 is replaced by a short circuit (not shown). Both modes of operation function in the same manner for the transition from N1 4 to E1 6, or from E1 6 to N1 4. For example, this occurs regardless whether the cause of transfer is a loss of a power source, an engine test function, a plant exercise function, a load shed from utility function, or another suitable cause. The step loading depends upon the transfer switch 8 (FIG. 1), since the transfer switch's time delay in its neutral position, which is greater than or equal to the time to open all of the controlled distribution circuit breakers 14,16 (FIG. 1), is employed in order to ensure that all EOs 26,28 open prior to connection to the power source E1 6.

EXAMPLE 4

If the control circuit 80 of FIG. 3 does not wish to step load upon return to the first power source N1 4, then another controller (not shown) or suitable external circuitry (e.g., circuit 100 of FIG. 5) can remove power from the open inputs 30 to the EOs 26,28. This allows the loads 21,21' to be energized immediately upon reconnecting to the first power source N1 4.

Figure 5:
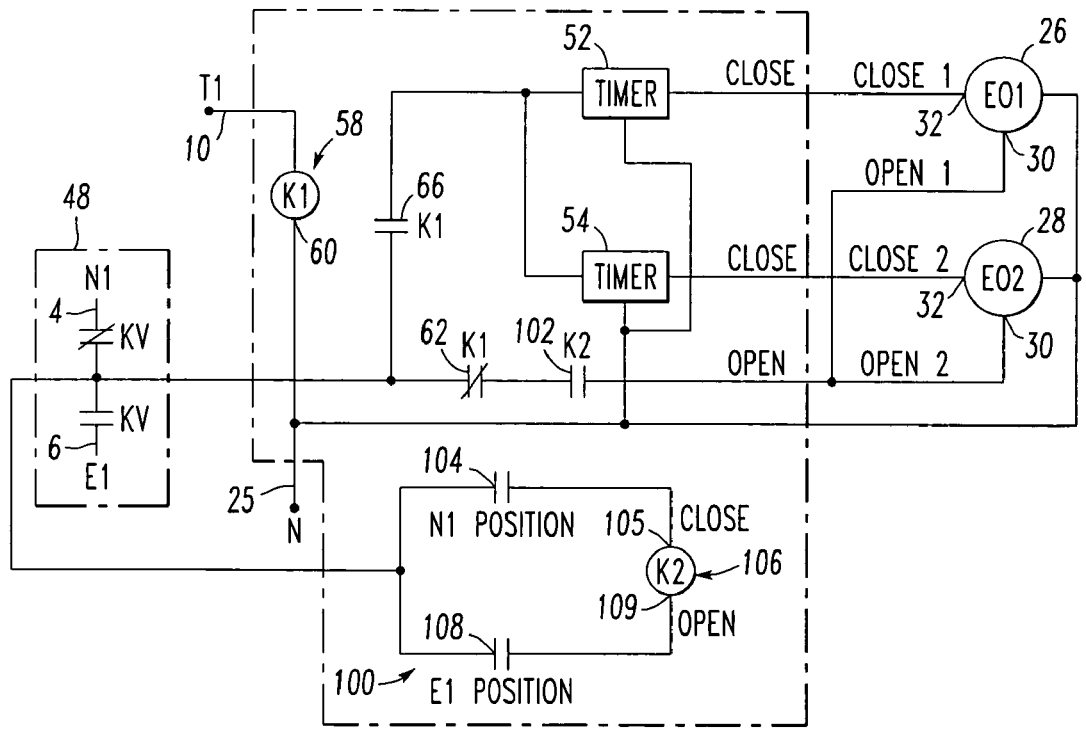
FIG. 5 is a block diagram of a control system in accordance with another embodiment of the invention.

As shown in FIG. 5, suitable firmware, PLC logic or other suitable external logic may allow the load distribution to remain closed (e.g., block load rather than step load) upon return to the first power source N1 4. The contact K2 NO 102 functions in a like manner as the contact KC NO 90 of FIG. 3. In other words, the detection of the N1 position 104 (e.g., by a suitable analog circuit; by the transfer switch 8) activates the close input 105 of latching relay K2 106, which closes contact 102. On the other hand, detection of the E1 position 108 (e.g., by a suitable analog circuit; by the transfer switch 8) activates the open input 109 of latching relay K2 106, which opens contact 102. This permits a block load upon the return to the first power source N1 4.

EXAMPLE 5

The control circuit 50 of FIG. 2 may step load a marginally sized emergency, alternate or back-up power source (e.g., uninterruptible power supply (UPS); fuel cell; microturbine (i.e., a relatively small gas turbine, which drives a generator); windmill), in order to decrease the inrush current to that power source. Hence, this permits the emergency or alternate power source to recover from, for example, voltage sags or under speed conditions, prior to applying additional load(s). This also decreases the inrush current requirements that result from block loading of back-up power sources.

EXAMPLE 6

Another application for the control circuit 50 of FIG. 2 is where a power supplier wishes to selectively supply emergency, alternate or back up power to selected load(s) and/or to keep from powering certain load(s), which do not require such power (e.g., a cell tower site or apartment building where one or more customers pay for back up power and one or more other customers do not). This permits the power supplier to selectively power loads from a transfer mechanism (e.g., transfer switch 8), in order that only those customers that require emergency, alternate or back up power receive it, while other customers that do not require such power do not receive it. This may be based upon the requirements of the energy supplier and/or the customer base. For example, a cell tower site (not shown) may carry several customers, but employ only one back-up power supply for some or all of those customers.

EXAMPLE 7

Although two EOs 26,28 are shown in FIGS. 1–3 and 5, any suitable count of one or more EOs may be employed. For example, the count of EOs may be determined based upon customer (e.g., load) requirements. The control circuit 50 of FIG. 2 may employ a combination of electrically controlled and/or manually operated switching devices.

EXAMPLE 8

Although EOs 26,28 are disclosed, the invention is applicable to any suitable operator, such as, for example, a solenoid operator (e.g., without limitation, a CH EOP1T07 120 VAC solenoid operator marketed by Eaton Electrical, Inc. of Pittsburgh, Pa.) and a motor operator (e.g., without limitation, a CH MOP1P07 120 VAC motor operator marketed by Eaton Electrical, Inc.).

EXAMPLE 9

Although relays 58, KV and 106 are disclosed, the invention is applicable to any suitable control logic or device, such as, for example, an IDEC RH2B-U form C relay marketed by IDEC Corporation of Sunnyvale, Calif.; and a B255BXBP latching relay marketed by Magnecraft & Struthers-Dunn of Darlington, S.C.

EXAMPLE 10

Although the transfer switch 8 is disclosed, the invention is applicable to any suitable transfer mechanism, such as, for example, an automatic transfer switch; a non-automatic transfer switch; a manual transfer switch.

EXAMPLE 11

Although a distribution panel 12 is shown, any suitably controllable device, such as a circuit interrupter, a circuit breaker, a contactor, a motor starter and/or a series combination of two or more of such devices or similar devices may be employed.

Although the control circuit 50 implements a logic circuit in relay logic, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A power distribution system for a first power source and a second power source, said system comprising:
   means for inputting said first power source and said second power source, and switching one of said first power source and said second power source to an output;
   at least one electrical switching apparatus, each of said at least one electrical switching apparatus including an input electrically connected to the output of said means for inputting, an output, separable contacts electrically connected between said input and said output, and an operating mechanism for opening and closing said separable contacts;
   at least one operator, each of said at least one operator including a first input, a second input, and an operator member cooperating with the operating mechanism of a corresponding one of said at least one electrical switching apparatus, the operator member of said at least one operator responsive to the first input thereof to actuate the operating mechanism of the corresponding one of said at least one electrical switching apparatus to open the separable contacts thereof, the operator member of said at least one operator responsive to the second input thereof to actuate the operating mechanism of the corresponding one of said at least one electrical switching apparatus to close the separable contacts thereof; and a control circuit including a first input for said first power source, a second input for said second power source, a third input for the output of said means for inputting, at least one first output electrically connected to the first input of a corresponding one of said at least one operator, at least one second output electrically connected to the second input of a corresponding one of said at least one operator, and means for delaying said at least one second output or inhibiting at least one of said at least one second output after said means for inputting switches to the other one of said first and second power sources.

2. The power distribution system of claim 1 wherein said means for inputting is a transfer switch including a first input for said first power source, a second input for said second power source, and said output of said means for inputting, said transfer switch switching one of said first and second inputs of said transfer switch to said output thereof.

3. The power distribution system of claim 1 wherein said first power source is a utility power source; and wherein said second power source is an emergency power source.

4. The power distribution system of claim 1 wherein said at least one electrical switching apparatus is one electrical switching apparatus for one load; wherein said at least one operator is one operator including the operator member cooperating with the operating mechanism of said one electrical switching apparatus; and wherein said control circuit includes one first output, one second output, means for energizing said one first output responsive to loss of one of said first and second power sources in order to open the separable contacts of said one electrical switching apparatus, and means for energizing said one second output a predetermined time after said means for inputting switches to the other one of said first and second power sources in order to close the separable contacts of said one electrical switching apparatus, thereby outputting power for said load said predetermined time after said means for inputting switches to the other one of said first and second power sources.

5. The power distribution system of claim 1 wherein said at least one electrical switching apparatus is a plurality of electrical switching apparatus for a plurality of loads; wherein said at least one operator is a plurality of operators each of which includes the operator member cooperating with the operating mechanism of a corresponding one of said electrical switching apparatus; and wherein said control circuit includes a plurality of first outputs, a plurality of second outputs, means for energizing said first outputs responsive to loss of one of said first and second power sources in order to open the separable contacts of said electrical switching apparatus, and a plurality of means, each of said means for energizing a corresponding one of said second outputs a corresponding predetermined time after said means for inputting switches to the other one of said first and second power sources in order to close the separable contacts of said corresponding one of said electrical switching apparatus, thereby outputting power for a corresponding one of said loads said corresponding predetermined time after said means for inputting switches to the other one of said first and second power sources, with the corresponding predetermined time of at least one of said loads being different than the corresponding predetermined time of the others of said loads, in order to sequentially step power to said loads at different times.

6. The power distribution system of claim 1 wherein said at least one electrical switching apparatus is a plurality of electrical switching apparatus for a plurality of loads; wherein said at least one operator is a plurality of operators each of which includes the operator member cooperating with the operating mechanism of a corresponding one of said electrical switching apparatus; and wherein said control circuit includes a plurality of first outputs, a plurality of second outputs, means for energizing said first outputs responsive to loss of voltage at the output of said means for inputting in order to attempt to open the separable contacts of said electrical switching apparatus, and means for energizing less than all of said second outputs after said means for inputting switches to the other one of said first and second power sources in order to close the separable contacts of less than all of said electrical switching apparatus, thereby selectively applying power to less than all of said loads after said means for inputting switches to said other one of said first and second power sources, and for energizing all of said second outputs after said means for inputting switches to said one of said first power source and said second power source in order to close the separable contacts of all of said electrical switching apparatus, thereby outputting power for all of said loads after said means for inputting switches to said one of said first power source and said second power source.

7. The power distribution system of claim 1 wherein said at least one electrical switching apparatus is a circuit breaker including an operating handle; and wherein said at least one operator is an electrical operator including said operator member, which engages the operating handle of said circuit breaker.

8. The power distribution system of claim 1 wherein said control circuit further includes a load sensing relay having a coil energized by said first power source or said second power source, a normally closed contact and a normally open contact; and wherein said means for delaying said at least one second output or inhibiting at least one of said at least one second output of said control circuit includes for each of said at least one second output a time delay relay having an input energized by said normally open contact and an output, which is said at least one second output.

9. The power distribution system of claim 1 wherein said means for delaying of said control circuit provides a predetermined delay of said at least one second output after said means for inputting switches to the other one of said first and second power sources, and provides said same predetermined delay of said at least one second output after said means for inputting switches to said one of said first power source and said second power source.

10. The power distribution system of claim 9 wherein said control circuit includes a time delay relay including said predetermined time for each of said at least one second output.

11. The power distribution system of claim 9 wherein said control circuit includes a programmable logic controller providing said predetermined time for each of said at least one second output.

12. The power distribution system of claim 9 wherein said means for delaying said at least one second output or inhibiting at least one of said at least one second output after said means for inputting switches to the other one of said first and second power sources enables at least one of said at least one second output after said means for inputting switches to the other one of said first and second power sources, and inhibits at least one of said at least one second output after said means for inputting switches to the other one of said first and second power sources.

13. The power distribution system of claim 1 wherein said means for delaying of said control circuit provides a first predetermined delay of said at least one second output after said means for inputting switches to the other one of said first and second power sources, and provides a shorter second delay of said at least one first output after said means for inputting switches to said one of said first power source and said second power source.

14. The power distribution system of claim 13 wherein said means for delaying includes a programmable logic controller.

15. The power distribution system of claim 13 wherein said at least one operator is at least one electrical operator, each of said at least one electrical operator including the operator member cooperating with the operating mechanism of said at least one electrical switching apparatus; wherein said at least one first output of said control circuit is one first open output, wherein said at least one second output of said control circuit is one second close output; wherein said control circuit includes means for energizing said one first open output responsive to loss of one of said first and second power sources in order to open the separable contacts of said at least one electrical switching apparatus, and means for energizing said one second close output a predetermined time after said means for inputting switches to the other one of said first and second power sources in order to close the separable contacts of said at least one electrical switching apparatus, thereby outputting power for said load said predetermined time after said means for inputting switches to the other one of said first and second power sources; wherein said means for delaying provides the first predetermined delay of said one second close output after said means for inputting switches to the other one of said first and second power sources, and provides the shorter second delay of said one first open output after said means for inputting switches to the other one of said first and second power sources; and wherein said means for delaying includes means for disabling said one first open output after the other one of said first and second power sources switches to said one of said first power source and said second power source.

16. The power distribution system of claim 15 wherein said means for disabling is a latching relay including a coil having a first close input, which is energized after said means for inputting switches to said one of said first power source and said second power source, a second open input, which is energized after said means for inputting switches to the other one of said first and second power sources, and a normally open contact, which is electrically connected in series between said one first open output and said first input of said at least one electrical operator.

17. The power distribution system of claim 3 wherein said at least one electrical switching apparatus is a plurality of electrical switching apparatus for a plurality of loads; wherein said at least one operator is a plurality of operators each of which includes the operator member cooperating with the operating mechanism of a corresponding one of said electrical switching apparatus; and wherein said control circuit includes a plurality of first outputs, a plurality of second outputs, means for energizing said first outputs responsive to loss of said utility power source in order to open the separable contacts of said electrical switching apparatus, and a plurality of means, each of said means for energizing a corresponding one of said second outputs a corresponding predetermined time after said means for inputting switches to said emergency power source in order to close the separable contacts of said corresponding one of said electrical switching apparatus, thereby outputting power for a corresponding one of said loads said corresponding predetermined time after said means for inputting switches to said emergency power source, with the corresponding predetermined time of at least one of said loads being different than the corresponding predetermined time of the others of said loads, in order to sequentially step power to said loads at different times.

18. The power distribution system of claim 3 wherein said at least one electrical switching apparatus is a plurality of electrical switching apparatus for a plurality of loads; wherein said at least one operator is a plurality of operators each of which includes the operator member cooperating with the operating mechanism of a corresponding one of said electrical switching apparatus; and wherein said control circuit includes a plurality of first outputs, a plurality of second outputs, means for energizing said first outputs responsive to loss of said emergency power source in order to open the separable contacts of said electrical switching apparatus, and a plurality of means, each of said means for energizing a corresponding one of said second outputs a corresponding predetermined time after said means for inputting switches to the said utility power source in order to close the separable contacts of said corresponding one of said electrical switching apparatus, thereby outputting power for a corresponding one of said loads said corresponding predetermined time after said means for inputting switches to said utility power source, with said corresponding predetermined time of each of said loads being about equal, in order to power to said loads at about the same times.

19. A control system for a power distribution system including a first power source, a second power source, a transfer mechanism and at least one electrical switching apparatus, said transfer mechanism inputting said first power source and said second power source and switching one of said first power source and said second power source to an output, each of said at least one electrical switching apparatus including an input electrically connected to the output of said transfer mechanism, an output, separable contacts electrically connected between the input and the output of said electrical switching apparatus, and an operating mechanism for opening and closing said separable contacts, said control system comprising:

at least one operator, each of said at least one operator including a first input, a second input, and an operator member adapted to cooperate with the operating mechanism of a corresponding one of said at least one electrical switching apparatus, the operator member of said at least one operator responding to the first input thereof for actuating the operating mechanism of the corresponding one of said at least one electrical switching apparatus to open the separable contacts thereof, the operator member of said at least one operator responding to the second input thereof for actuating the operating mechanism of the corresponding one of said at least one electrical switching apparatus to close the separable contacts thereof;

a first input for said first power source;

a second input for said second power source;

a third input for the output of said transfer mechanism;

at least one first output electrically connected to the first input of a corresponding one of said at least one operator;

at least one second output electrically connected to the second input of a corresponding one of said at least one operator; and means for delaying said at least one second output or inhibiting at least one of said at least one second output after said means for inputting switches to the other one of said first and second power sources.

20. The control system of claim 19 wherein said at least one electrical switching apparatus is a plurality of electrical switching apparatus for a plurality of loads; wherein said at least one operator member is a plurality of operator members; wherein said at least one operator is a plurality of operators, each of which includes a corresponding one of said operator members cooperating with the operating mechanism of a corresponding one of said electrical switching apparatus; wherein said at least one first output is a plurality of first outputs; wherein said at least one second output is a plurality of second outputs; wherein said means for delaying includes means for energizing said first outputs responsive to loss of one of said first and second power sources in order to open the separable contacts of said electrical switching apparatus, and a plurality of means, each of said means for energizing a corresponding one of said second outputs a corresponding predetermined time after said means for inputting switches to the other one of said first and second power sources in order to close the separable contacts of said corresponding one of said electrical switching apparatus, thereby outputting power for a corresponding one of said loads said corresponding predetermined time after said means for inputting switches to the other one of said first and second power sources, with the corresponding predetermined time of at least one of said loads being different than the corresponding predetermined time of the others of said loads, in order to sequentially step power to said loads at different times.

* * * * *